US010102929B2

(12) United States Patent
Kim et al.

(10) Patent No.: US 10,102,929 B2
(45) Date of Patent: Oct. 16, 2018

(54) METHOD OF PREPARING NUCLEAR FUEL PELLET INCLUDING THERMAL CONDUCTIVE METAL AND NUCLEAR FUEL PELLET PREPARED THEREBY

(71) Applicant: KOREA ATOMIC ENERGY RESEARCH INSTITUTE, Daejeon (KR)

(72) Inventors: Dong-Joo Kim, Daejeon (KR); Young Woo Rhee, Daejeon (KR); Keon-Sik Kim, Daejeon (KR); Jong-Hun Kim, Yuseong-gu (KR); JangSoo Oh, Chungcheongnam-do (KR); Jae-Ho Yang, Sejong-si (KR); Yang-Hyun Koo, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 916 days.

(21) Appl. No.: 14/591,498

(22) Filed: Jan. 7, 2015

(65) Prior Publication Data
US 2016/0372215 A1 Dec. 22, 2016

(30) Foreign Application Priority Data

May 26, 2014 (KR) .................. 10-2014-0063122

(51) Int. Cl.
*G21C 3/04* (2006.01)
*G21C 21/02* (2006.01)
*G21C 3/62* (2006.01)

(52) U.S. Cl.
CPC ............... *G21C 3/04* (2013.01); *G21C 3/623* (2013.01); *G21C 21/02* (2013.01); *G21C 2003/045* (2013.01); *Y02E 30/38* (2013.01)

(58) Field of Classification Search
CPC .......... G21C 3/04; G21C 21/02; G21C 3/623; G21C 2003/045; Y02E 30/38
See application file for complete search history.

(56) References Cited

U.S. PATENT DOCUMENTS 3,051,566 A * 8/1962 Schwartz .............. B22F 1/0096
419/20
5,882,552 A * 3/1999 Song .................... C01G 43/025
264/37.1

(Continued)

FOREIGN PATENT DOCUMENTS

JP         4-1594 A       1/1992
KR    1020040047522 A    6/2004
WO   WO-2014028731 A1 *  2/2014 ............. G21C 21/02

*Primary Examiner* — Peter F Godenschwager
*Assistant Examiner* — Andrew J. Oyer
(74) *Attorney, Agent, or Firm* — Maier & Maier, PLLC

(57) ABSTRACT

A method of a nuclear fuel pellet including a thermal conductive metal and a nuclear fuel pellet prepared thereby. The method includes preparing an oxide nuclear fuel granule having about 30%-45% theoretical density, mixing the fuel granule with thermal conductive metal powder, compacting the fuel granule with which the thermal conductive metal powder is mixed to prepare a green pellet, and sintering the green pellet. In the method, the sintering may be performed under a reducing gas atmosphere that is the same as the commercial pellet preparing process. Thus, compatibility compared to existing commercial preparing processes may be superior. Also, since a liquefied oxide formation process and a reducing process are omitted, the distribution uniformity of the metal material within the pellet may be superior. Therefore, the nuclear fuel pellet in which the metal network and fine microstructure are uniformly distributed within the pellet may be prepared.

14 Claims, 5 Drawing Sheets

(56) References Cited

U.S. PATENT DOCUMENTS

| 6,221,286 B1* | 4/2001 | Dehaudt | G21C 3/17 |
| | | | 264/0.5 |
| 2004/0103752 A1* | 6/2004 | Song | G21C 3/623 |
| | | | 75/232 |

* cited by examiner

METHOD OF PREPARING NUCLEAR FUEL PELLET INCLUDING THERMAL CONDUCTIVE METAL AND NUCLEAR FUEL PELLET PREPARED THEREBY

CROSS-REFERENCES TO RELATED APPLICATION

This patent application claims the benefit of priority under 35 U.S.C. § 119 from Korean Patent Application No. 10-2014-0063122 filed May 26, 2014, the contents of which are incorporated herein by reference.

BACKGROUND OF THE INVENTION

1. Field of the Invention

The present disclosure relates to a method of preparing a nuclear fuel pellet including a thermal conductive metal and a nuclear fuel pellet prepared thereby, and more particularly, to a method of preparing a nuclear fuel pellet having superior thermal conductivity by mixing thermal conductive metal powder.

2. Description of the Related Art

Nuclear power generation uses heat generated by the nuclear fission. Several tens to several hundred fuel pellets that are formed of a nuclear fuel material are put into a zirconium alloy cladding tube to seal each of both ends of the zirconium alloy cladding tube by welding, thereby manufacturing a fuel rod. Then, several fuel rods to several hundred fuel rods are bundled with each other to manufacture one assembly. The fuel rod assembly may be fed into a light water reactor or heavy water reactor. Here, heat generated from the nuclear fuel pellets is transferred into cooling water that flows around the fuel rods through the cladding tube via the nuclear fuel pellets.

A cylindrical pellet prepared by compacting and sintering a single or mixed material of oxides such as uranium (U), plutonium (Pu), or thorium (Th) may be used as a nuclear fuel that is used for nuclear power generation. Here, uranium dioxide ($UO_2$) may be generally used as a material for forming the nuclear fuel pellet. In some cases, a nuclear fuel material in which at least one of other nuclear fuel materials such as oxides of Pu, Th, and Gd is added to uranium dioxide ($UO_2$) may be used as the material for forming the nuclear fuel pellet. Particularly, the nuclear fuel pellet may be formed of $(U,Pu)O_2$, $(U,Th)O_2$, $(U,Gd)O_2$, $(U,Pu,Gd)O_2$, or $(U,Th,Pu)O_2$.

According to a method of preparing an uranium oxide pellet that is a most widely-used nuclear fuel, a lubricant may be added to and mixed with uranium oxide powder that is used as a starting material to preliminarily compact the mixture at a pressure of about 1 ton/cm2, thereby preparing slug, and then, to pulverize the slug, thereby preparing granules. Thereafter, a lubricant may be added to and mixed with the prepared granules, and then, the mixture may be compressed/compacted and sintered under a hydrogen-containing gas atmosphere to prepare a fuel pellet. Here, the uranium oxide pellet that is prepared in the above-described process may generally have a cylindrical shape and a density of about 95% of a theoretical density (T.D.).

Also, $(U,Pu)O_2$ or $(U,Th)O_2$ pellets may be prepared through a method that is similar to the method of preparing the uranium oxide pellet after plutonium oxide ($PuO_2$) or thorium oxide ($ThO_2$) powder is mixed with uranium oxide powder. Also, $(U,Gd)O_2$ pellets that are burnable absorber nuclear fuels may be prepared through a method that is similar to the method of preparing the uranium oxide pellet after gadolinium oxide powder is mixed with uranium oxide powder.

As described above, since the uranium dioxide ($UO_2$) that is a representative nuclear fuel material has a high melting point and good compatibility with cooling water, the $UO_2$ is widely used as the nuclear fuel material. However, the $UO_2$ may have significantly low thermal conductivity of about 2 W/m·K to about 5 W/m·K in a workable temperature range. Here, due to the low thermal conductivity of nuclear fuel material in pellet, the fuel pellet may have a stiff temperature gradient. That is to say, the pellet may have a relatively high central temperature and a relatively low surface temperature. Here, a difference between the surface temperature and the central temperature of the pellet is inversely proportional to thermal conductivity. Thus, as the more the thermal conductivity decreases, the more the central temperature of the pellet increases. In the nuclear fuel rod that is normally burnt, the central temperature of the pellet may range from about 1,000° C. to about 1,500° C. Also, when a critical accident occurs, the $UO_2$ may have a melting temperature of about 2,800° C. or more.

Also, since the nuclear fuel pellet has a high temperature and high thermal gradient, all reactions depending on the temperature may be accelerated to deteriorate material performance. Particularly, as a degree of burnup increases, the deterioration in material performance may increase.

Further, if the nuclear fuel pellet is in a high-temperature state, margin with respect to stability in various nuclear reactor accidents may reduce. For example, in case of a loss-of-coolant accident, when a temperature of the nuclear fuel just before the accident is high, the margin may be low. In case of a fuel-rod power ramping condition, since the pellet has low thermal conductivity, the central temperature of the pellet may be significantly higher than that in a normal operation condition. If the power is significantly limited to prevent the above-described problem from occurring, the fuel rod may not make a high output, the economic losses may occur.

To solve the problem in which the oxide nuclear fuel pellet has low thermal conductivity, Korean Patent Publication No. 10-2004-0047522 discloses a method of preparing a nuclear fuel containing a tungsten metal network, and more particularly, a method of preparing a nuclear fuel pellet including a tungsten metal network, in which a green pellet formed of nuclear fuel powder and tungsten oxide is heated under a reducing gas atmosphere to prepare a preliminary pellet, the preliminary pellet is heated under an oxidative gas atmosphere to form a tungsten oxide liquid network on the preliminary pellet, and the tungsten oxide liquid network is reduced to prepare the nuclear fuel pellet including the tungsten metal network.

However, according to the conventional preparing method as described above, two sintering processes may be performed under the oxidative gas and reducing gas atmosphere. This may be difficult from the existing commercial pellet fabrication process that is mainly performed under the reducing gas atmosphere. As a result, compatibility between the existing process and the above-described conventional method may occur. In addition, it may be difficult to change the gas atmosphere for each process during the processes.

Also, although the feature in which the liquid oxide is uniformly distributed along a grain boundary of the pellet like the related art is advantageous for the improvement in thermal conductivity, oxide volatilization in the liquid phase may occur.

Further, in the process of reducing the distributed liquid oxide, undesired pores may be formed in the pellet due to a change in volume and oxygen emission. Thus, poor fine structures may be formed in an outer portion of the pellet to deteriorate distribution uniformity of the metal material.

Thus, while the inventors study methods for effectively improving thermal conductivity of the nuclear fuel pellet, the inventors have developed a method in which, when a granule prepared from the oxide powder of nuclear fuel material are adequately adjusted in density and mixed with thermal conductive metal powder to prepare a pellet, the pellet is improved in thermal conductive while directly applying the existing pellet preparing process.

PRIOR ART DOCUMENTS

Patent Documents (Patent Document 1) Korean Patent Publication Notification No. 10-2004-0047522

SUMMARY OF THE INVENTION

Embodiments of the present invention are directed to provide a method of preparing a nuclear fuel pellet including a thermal conductive metal and a nuclear fuel pellet prepared thereby.

According to an aspect of the present invention, there is provided a method of preparing a nuclear fuel pellet including a thermal conductive metal network, the method including: (step 1) preparing an oxide nuclear fuel granule having about 30% to about 45% theoretical density (T.D.); (step 2) mixing the oxide nuclear fuel granule prepared in step 1 with thermal conductive metal powder; (step 3) compacting the oxide nuclear fuel granule with which the thermal conductive metal powder is mixed in step 2 to prepare a green pellet; and (step 4) sintering the green pellet prepared in step 3.

According to another aspect of the present invention, there is provided a nuclear fuel pellet including a thermal conductive metal having a network structure, which is prepared according to the above-described method and a nuclear fuel pellet as set forth in claim 9 and a nuclear fuel cladding tube into which a plurality of nuclear fuel pellets are fed.

According to further another aspect of the present invention, there is provided a method of improving thermal conductivity of a nuclear fuel pellet, the method including: (step 1) mixing an oxide nuclear fuel granule having about 30% to about 45% theoretical density (T.D.) with thermal conductive metal powder; (step 2) compacting the oxide nuclear fuel granule with which the thermal conductive metal powder is mixed in step 2 to prepare a green pellet; and (step 3) sintering the green pellet prepared in step 2, wherein a network structure of the thermal conductive metal is formed in the pellet.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
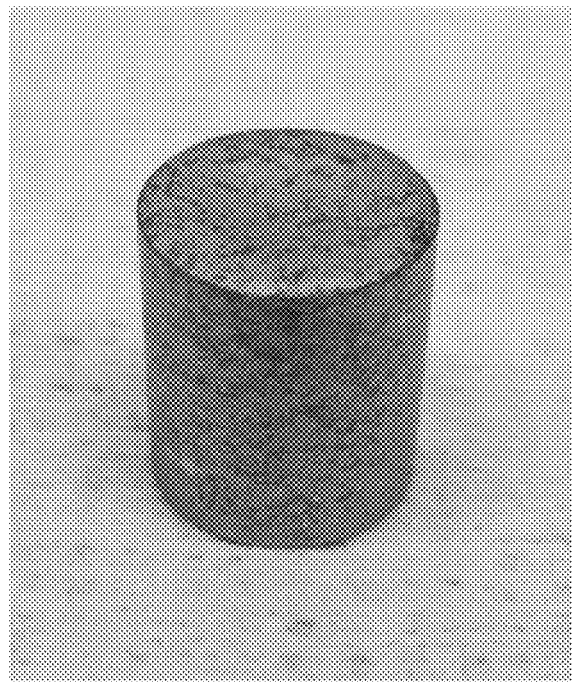
FIG. 1 is a photograph of a nuclear fuel pellet prepared according to the present invention.

The present invention provides a method of preparing a nuclear fuel pellet including a thermal conductive metal. The method of preparing the nuclear fuel pellet includes a process (step 1) of preparing an oxide nuclear fuel granule having a theoretical density (T.D.) of about 30% to about 45%, a process (step 2) of mixing the oxide nuclear fuel granule prepared in step 1 with thermal conductive metal powder, a process (step 3) of compacting the oxide nuclear fuel granule with which the thermal conductive metal powder is mixed in step 2 to prepare a green pellet, and a process (step 4) of sintering the green pellet prepared in step 3.

Hereinafter, the method of preparing the nuclear fuel pellet in each of the processes according to the present invention will be described in detail.

In the method of preparing the nuclear fuel pellet including the thermal conductive metal according to the present invention, step 1 is a process of preparing the oxide nuclear fuel granule.

The nuclear fuel pellet to be prepared according to the present invention may be applied to a nuclear reactor for producing heat by using nuclear fission. Since the nuclear reactor is in a high-temperature high-pressure state, a temperature of a nuclear fuel may be closely related to safety of the nuclear reactor and nuclear fuel. Here, in case of the oxide nuclear fuel, particularly, uranium dioxide nuclear fuel that is most widely used in recent years, the uranium dioxide nuclear fuel may have very low thermal conductivity of about 1~4 W/m·K under operation conditions of the nuclear reactor.

Thus, to improve the low thermal conductivity of the oxide nuclear fuel, the present invention provides the method of preparing the nuclear fuel pellet including the thermal conductive metal as described above. In step 1 of the preparing method according to the present invention, the oxide nuclear fuel granule having the theoretical density (T.D.) of about 30% to about 45% is prepared.

According to the related art, metal oxide powder including a thermal conductive metal and uranium dioxide powder are mixed with each other, and then, the mixture is compacted and sintered to prepare a pellet. However, in case where the metal oxide powder is used like the related art, the metal oxide may be liquefied during the sintering. Thus, the liquid metal oxide may be volatilized.

Also, when the liquid metal oxide is reduced, undesired pores may be formed in the pellet due to a change in volume and oxygen emission. Thus, poor fine structures may be formed in an outer portion of the pellet to significantly deteriorate distribution uniformity of the metal material.

Thus, to solve the above-described problem, the present invention may provide a method in which the oxide nuclear fuel granule is prepared first in step 1, wherein the granule has a theoretical density (T.D.) of about 30% to about 45%.

The granule prepared in step 1 may have a density that is closely related to characteristics of the final nuclear fuel pellet. Thus, when the granule has a density within the above-described density range, interface wholesomeness between the oxide nuclear fuel and the thermal conductive metal may be secured to prepare a high-density pellet.

If the granule prepared in step 1 has a density of about 30% T.D. or less, the finally prepared pellet may have poor fine structure wholesomeness. On the other hand, if the granule has a density of about 45% T.D. or more, it may be difficult to prepare the high-density nuclear fuel pellet, and also, the fine structure wholesomeness may be poor.

In the method of preparing the granule in step 1, the granule may be prepared to satisfy the above-described density range and be limited in preparing process or method. However, when considering reproductively in process of preparing the granule, the oxide nuclear fuel powder may be pressed and pulverized at an adequate pressure and then be filtered by using a sieve to prepare granules having uniform sizes. For example, the granule prepared in step 1 may be prepared by pressing the oxide nuclear fuel powder at a pressure of about 30 MPa to about 150 MPa and then pulverizing the pressed oxide nuclear fuel powder.

The oxide nuclear fuel used in step 1 may be a metal oxide nuclear fuel, for example, $UO_2$, $PuO_2$, or $ThO_2$. Preferably, although the $UO_2$ is used, the present invention is not limited thereto. For example, all kinds of oxide nuclear fuels having high thermal conductivity may be used.

Also, the oxide nuclear fuel granule prepared in step 1 may have a size of about 200 μm to about 1,000 μm, but is not limited thereto.

In the method of preparing the nuclear fuel pellet including the thermal conductive metal according to the present invention, step 2 is a process of mixing the oxide nuclear fuel granule prepared in step 1 with the thermal conductive metal powder.

As described above, to improve the low thermal conductivity of the oxide nuclear fuel, the thermal conductive metal may be added to the pellet to improve the thermal conductivity of the pellet. Thus, the oxide nuclear fuel granule prepared in step 2 may be mixed with the thermal conductive metal powder.

Here, the thermal conductive metal used in step 2 may be molybdenum (Mo), tungsten (W), or chromium (Cr), but is not limited thereto.

Also, the thermal conductive metal used in step 2 may have a size of about 10 μm or less, more particularly, about 0.01 μm to about 10 μm.

The thermal conductive metal powder may be mixed at a ratio of about 5 volume % to 15 volume % with respect to the oxide nuclear fuel granule used in step 1. Since the thermal conductive metal is mixed with the oxide nuclear fuel as shown in step 2, the final pellet may have superior thermal conductivity. However, in case where the thermal conductive metal is mixed at a ratio lower than the above-described range, the improvement in thermal conductivity of the pellet may be insufficient. On the other hand, when the thermal conductive metal is mixed at a ratio greater than the above-described range, a loss of a nuclear fuel material feeding amount may increase to deteriorate economic feasibility of the nuclear fuel.

In the method of preparing the nuclear fuel pellet including the thermal conductive metal according to the present invention, step 3 is a process of compacting the oxide nuclear fuel granule with which the thermal conductive metal powder in step 2 to prepare a green pellet.

To prepare the nuclear fuel pellet, step 3 may be a process of preparing a green pellet by using the oxide nuclear fuel granule with which the thermal conductive metal powder in step 2 is mixed in step 2. The green pellet in step 3 may be prepared by being pressed and compacted at a pressure of about 100 MPa to about 500 MPa.

If the compaction in step 3 is performed at a pressure of about 100 MPa or less, the oxide nuclear fuel granule may not be sufficiently pressed to cause poor wholesomeness. As a result, it may be difficult to treat the green pellet during the moving or treating process. On the other hand, if the compaction in step 3 is performed at a pressure of about 500 MPa or less, the oxide nuclear fuel granule may be excessively pressed to cause cracks in the green pellet.

In the method of preparing the nuclear fuel pellet including the thermal conductive metal according to the present invention, step 4 is a process of sintering the green pellet prepared in step 3.

In the existing process of preparing the commercial nuclear fuel pellet, the green pellet may be prepared by using uranium dioxide that is a representative oxide nuclear fuel, and then the green pellet may be sintered under the reducing gas atmosphere. Here, in step 4 according to the present invention, the green pellet prepared in step 3 may be sintered to pellet. Here, the sintering may be performed under a hydrogen gas atmosphere to prepare the nuclear fuel pellet. As described above, in the preparing method according to the present invention, since the sintering is performed under the reducing gas atmosphere that is the same as that of the existing pellet preparing method, the compatibility with respect to the existing commercial preparing process may be very superior.

The sintering in step 4 may be performed at a temperature of about 1,300° C. to about 1,800° C. for about 1 hour to about 10 hours. If the sintering in step 4 is performed at a temperature of about 1,300° C. or less, it may be difficult to prepare a pellet having a density that is adequate for the nuclear fuel specification. On the other hand, if the sintering is performed at a temperature of about 1,800° C. or more, it may be difficult to manufacture and maintain a heating device.

Further, a time that is taken to perform the sintering process may be changed. Generally, the sintering process may be performed for and 1 hour to about 10 hours.

As described above, the method of preparing the nuclear fuel pellet according to the present invention, since the thermal conductive metal, but rather the metal oxide, is directly used when compared to the related art, the sintering may be performed under the reducing gas atmosphere that is the same as that of the commercial pellet preparing process. Thus, the compatibility with respect to the existing commercial preparing process may be very superior. In addition, since the liquefied oxide formation process and the reducing process are omitted, the distribution uniformity of the metal material within the pellet may be superior.

Also, the density of the nuclear fuel granule mixed with the metal powder may be optimally adjusted to prepare the high-density nuclear fuel pellet in which the metal network and the fine microstructure are uniformly distributed.

Also, the present invention may provide a nuclear fuel pellet including a thermal conductive metal having a network structure through the above-described preparing method.

The nuclear fuel pellet according to the present invention is provided to improve the low thermal conductivity of the oxide nuclear fuel according to the related art. That is, the nuclear fuel pellet according to the present invention may include the thermal conductive metal having the network structure to realize significantly high thermal conductivity when compared to that of the oxide nuclear fuel according to the related art.

Also, the thermal conductive metal having the network structure may be uniformly distributed in the whole or at least one of the nuclear fuel pellets to effectively emit heat. In addition, the thermal conductive metal having the network structure may have a density higher than about 96% T.D. that is adequate for the nuclear fuel.

Furthermore, the present invention provides a nuclear fuel including the nuclear fuel pellet and a nuclear fuel cladding tube in which a plurality of nuclear fuel pellets are fed.

The nuclear fuel according to the present invention includes the nuclear fuel pellet including the thermal conductive metal having the network structure and the nuclear fuel cladding tube in which the plurality of nuclear fuel pellets are fed. Thus, since the nuclear fuel pellet includes the thermal conductive metal having the network structure, heat produced during the nuclear fission may be effectively emitted to the outside, and thus, the nuclear reactor in which the nuclear fuel is fed may operate at a high reactor power and be economical.

Furthermore, the present invention provides a method of improving thermal conductivity of the nuclear fuel pellet. The method of improving the thermal conductivity of the nuclear fuel pellet includes a process (step 1) of mixing an oxide nuclear fuel granule having a theoretical density (T.D.) of about 30% to about 45% with thermal conductive metal powder, a process (step 2) of compacting the oxide nuclear fuel granule with which the thermal conductive metal power is mixed to prepare a green pellet, and a process (step 3) of the green pellet prepared in step 2. As a result, the thermal conductive metal having the network structure may be formed in the pellet.

Hereinafter, the method of improving the thermal conductivity of the nuclear fuel pellet according to the present invention will be described in detail. Here, steps 1 to 3 may be equally described by the above-described contents, and thus their detailed descriptions will be omitted.

The improvement method according to the present invention is a method of improving the thermal conductivity of the nuclear fuel pellet. That is, the oxide nuclear fuel that is widely used in recent years has relatively low thermal conductivity. Since the temperature of the nuclear fuel is closely related to safety of the nuclear reactor and nuclear fuel, studies for improving the thermal conductivity of the nuclear fuel have been variously conducted.

Here, the thermal conductive metal having high thermal conductivity may be added to the oxide nuclear fuel to improve the thermal conductivity of the nuclear fuel pellet. In the method according to the present invention, steps 1 to 3 may be performed to form a network structure of the thermal conductive metal in the pellet, thereby improving the thermal conductivity of the pellet.

Here, in the method according to the present invention, since the thermal conductive metal, but rather than the metal oxide, is directly used, the sintering may be performed once under the reducing gas atmosphere to improve the thermal conductivity of the pellet. In addition, the liquefied metal oxide formation and reducing processes may be omitted.

Also, the thermal conductivity of the nuclear fuel pellet may be improved, and the nuclear fuel pellet may have high density that is enough to satisfy the nuclear fuel specification. Thus, the nuclear fuel pellet having the improved thermal conductivity through the above-described method may be adequate for nuclear fuel materials Hereinafter, embodiments of the present invention will be described in more detail. However, the following embodiments may be exemplified merely as illustrative purpose, and thus the technical scope of the present invention is not limited thereto.

<Embodiment 1> Manufacture 1 of Oxide Nuclear Fuel Pellet

Step 1: Uranium dioxide powder was compacted at a pressure of about 30 MPa and then pulverized to filter pulverized granules by using a sieve, thereby preparing uranium dioxide granules having uniform sizes that correspond to about 30.8% T.D.

Step 2: The uranium dioxide granules prepared in step 1 and molybdenum metal powder that is a thermal conductive metal were mixed with each other. Here, the molybdenum metal powder was mixed at a ratio of about 10 volume % with respect to the uranium dioxide granules.

Step 3: The uranium dioxide granules with which the molybdenum metal powder is mixed in step 2 were compacted at a pressure of about 300 MPa to prepare a green pellet.

Step 4: The green pellet prepared in step 3 was sintered at a temperature of about 1,730° C. for about 4 hours under a hydrogen gas atmosphere to prepare a uranium dioxide nuclear fuel pellet.

<Embodiment 2> Manufacture 2 of Oxide Nuclear Fuel Pellet

The same process as Embodiment 1 except that the uranium dioxide powder is compacted at a pressure of about 50 MPa and pulverized to prepare uranium dioxide granules having uniform sizes that correspond to about 33% T.D. was performed to prepare an uranium dioxide nuclear fuel pellet. Here, the prepared uranium dioxide nuclear fuel pellet is shown in a photograph of FIG. 1.

<Embodiment 3> Manufacture 3 of Oxide Nuclear Fuel Pellet

The same process as Embodiment 1 except that the uranium dioxide powder is compacted at a pressure of about 100 MPa and pulverized to prepare uranium dioxide granules having uniform sizes that correspond to about 37.5% T.D. was performed to prepare an uranium dioxide nuclear fuel pellet.

<Embodiment 4> Manufacture 4 of Oxide Nuclear Fuel Pellet

The same process as Embodiment 1 except that the uranium dioxide powder is compacted at a pressure of about 150 MPa and pulverized to prepare uranium dioxide granules having uniform sizes that correspond to about 42.5% T.D. was performed to prepare an uranium dioxide nuclear fuel pellet.

Comparative Example 1

The same process as Embodiment 1 except that the uranium dioxide powder is compacted at a pressure of about 500 MPa and pulverized to prepare uranium dioxide granules having uniform sizes that correspond to about 53% T.D. was performed to prepare an uranium dioxide nuclear fuel pellet.

Comparative Example 2

The same process as Embodiment 1 except that the uranium dioxide powder is compacted at a pressure of about 600 MPa and pulverized to prepare uranium dioxide granules having uniform sizes that correspond to about 55.1% T.D. was performed to prepare an uranium dioxide nuclear fuel pellet.

Comparative Example 3

The same process as Embodiment 1 except that the uranium dioxide powder is compacted at a pressure of about 600 MPa, pre-sintered at a temperature of about 1,000° C. under a hydrogen gas atmosphere, and pulverized again to prepare uranium dioxide granules having uniform sizes that correspond to about 64% T.D. was performed to prepare an uranium dioxide nuclear fuel pellet.

Comparative Example 4

The same process as Embodiment 1 except that the uranium dioxide powder is compacted at a pressure of about 20 MPa and pulverized to prepare uranium dioxide granules having a uniform size that corresponds to about 25% T.D. was performed.

However, since the uranium dioxide granules have a significantly low density, the granules may be broken when the granules and the metal powder are mixed with each other.

<Experimental Example 1> Optical Microscope Observation

To analyze fine microstructures of the uranium nuclear fuel pellet prepared according to Embodiments and Comparative Examples, the pellets were observed through an optical microscope, and the observed results were illustrated in FIGS. 2 to 6.

Figure 2:
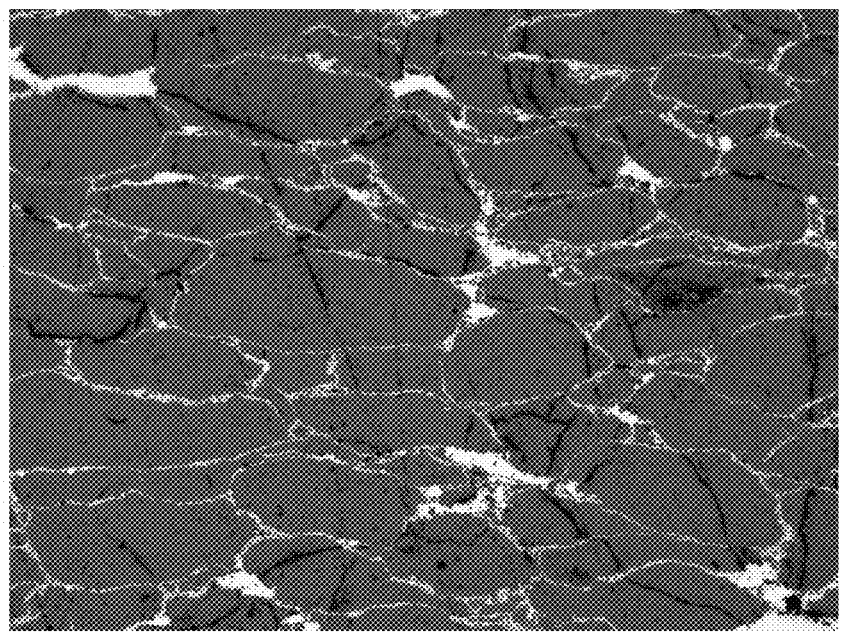
FIG. 2 is a photograph, taken with an optical microscope, of a nuclear fuel pellet prepared according to Embodiment 1 of the present invention.
Figure 3:
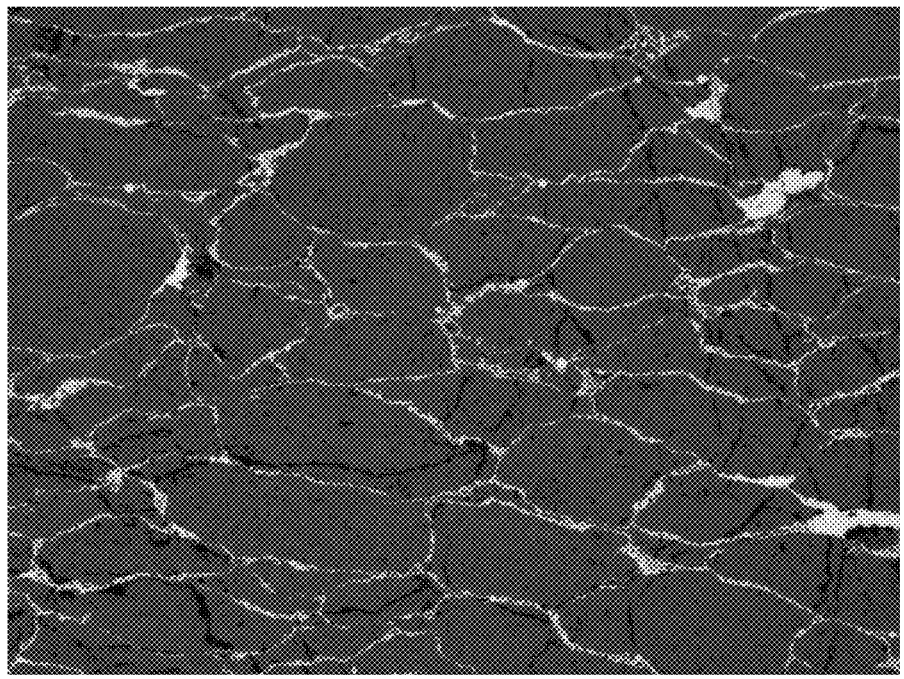
FIG. 3 is a photograph, taken with an optical microscope, of a nuclear fuel pellet prepared according to Embodiment 2 of the present invention.

As illustrated in FIGS. 2 and 3, it is seen that the nuclear fuel pellets prepared according to Embodiments 1 and 2 of the present invention have superior interface wholesomeness between the uranium dioxide and the molybdenum metal. Particularly, it is seen that the nuclear fuel pellet prepared according to Embodiment 2 has the greatest interface wholesomeness.

Figure 4:
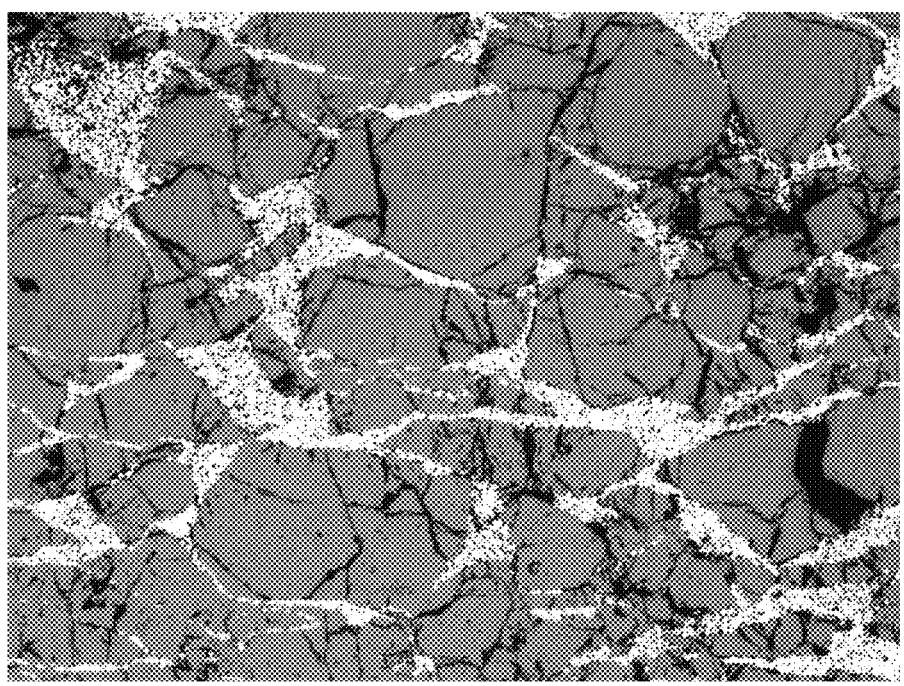
FIG. 4 is a photograph, taken with an optical microscope, of a nuclear fuel pellet prepared according to Comparative Example 1.
Figure 5:
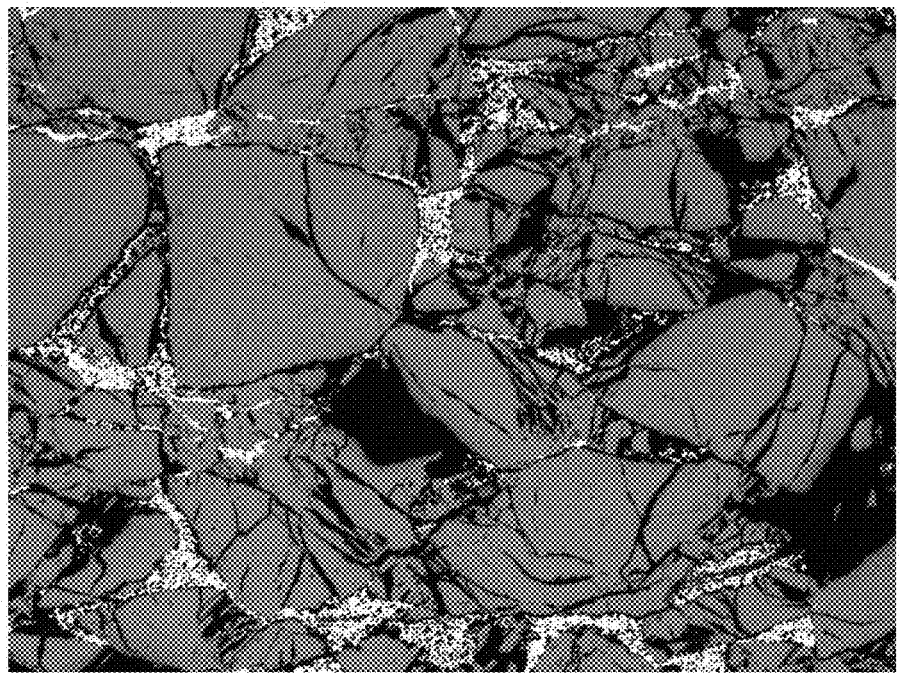
FIG. 5 is a photograph, taken with an optical microscope, of a nuclear fuel pellet prepared according to Comparative Example 2.
Figure 6:
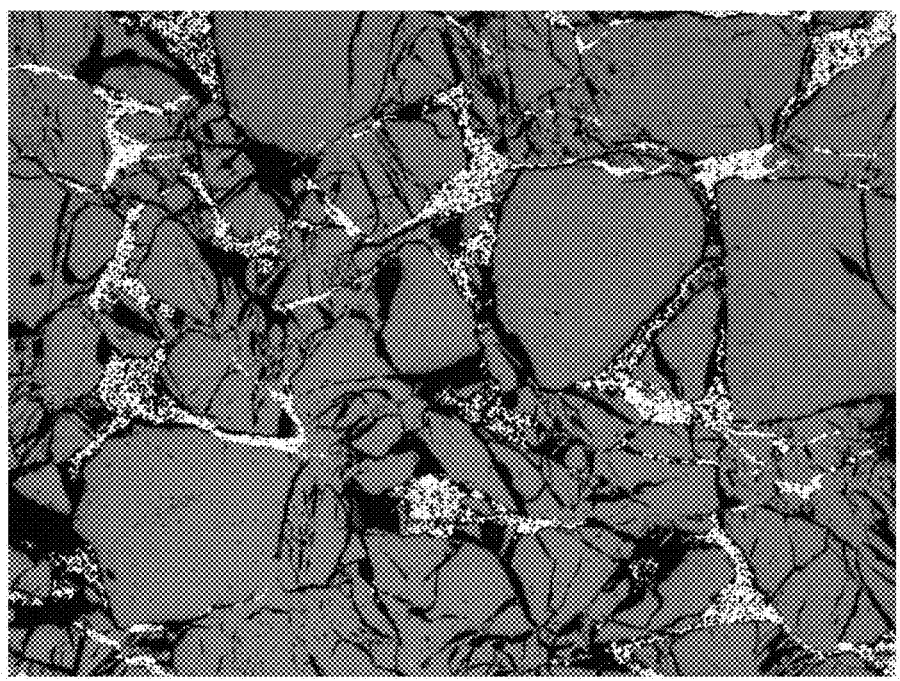
FIG. 6 is a photograph, taken with an optical microscope, of a nuclear fuel pellet prepared according to Comparative Example 3.

On the other hand, as illustrated in FIGS. 4 to 6, it is seen that the nuclear fuel pellets prepared according to Comparative Examples 1 to 3 have poor interface wholesomeness between the uranium dioxide and the molybdenum metal.

That is, it is seen from the analyzed results that the nuclear fuel pellet having superior interface wholesomeness between the nuclear fuel and the thermal conductive metal is prepared by optimally adjusting the density of the granules in the preparing method according to the present invention.

<Experimental Example 2> Analysis of Thermal Diffusivity of Pellet

Figure 7:
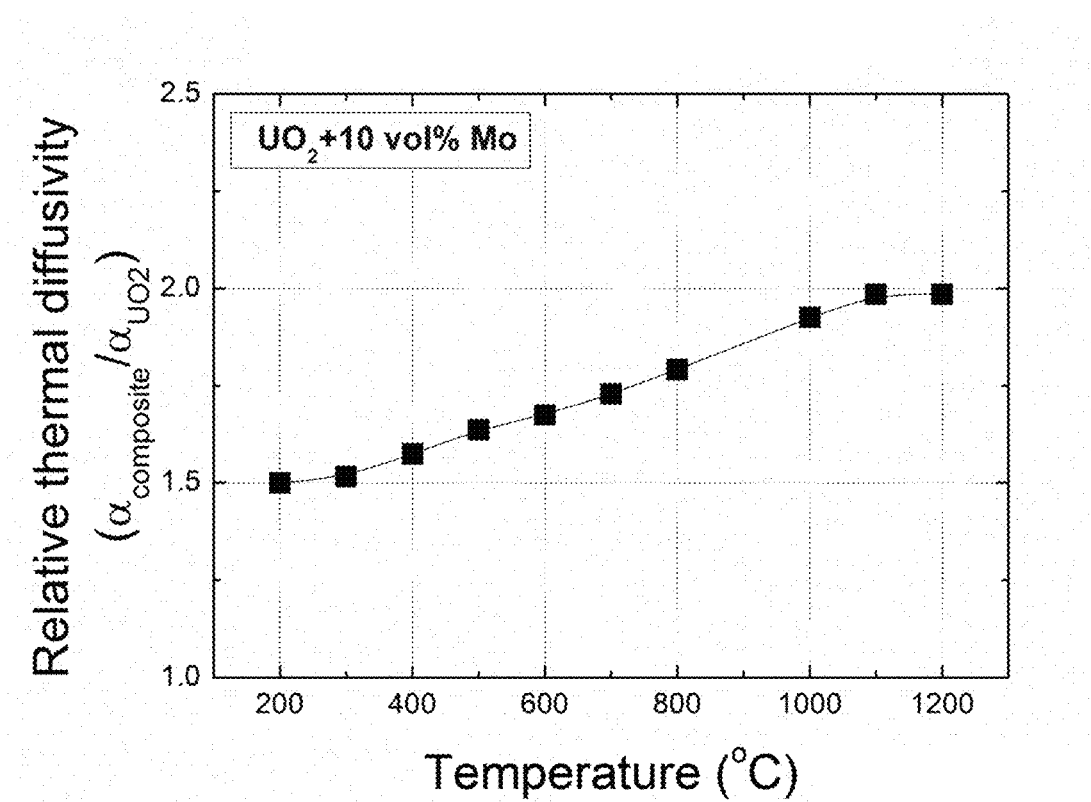
FIG. 7 is a graph illustrating thermal diffusivity of the nuclear fuel pellet prepared according to Embodiment 2 of the present invention.

To analyze the thermal diffusivity of the uranium dioxide nuclear fuel pellet prepared according to Embodiment 2, thermal diffusivity was measured and analyzed by using a laser flash device, and the analyzed results were illustrated in FIG. 7.

As illustrated in FIG. 7, it is seen that the nuclear fuel pellet prepared according to the present invention significantly increases in thermal diffusivity under all of the performed temperature conditions in comparison to the existing $UO_2$ pellet. Also, it is seen that the thermal diffusivity further increase at a temperature of about 1,000° C. that corresponds to a central temperature of the pellet when the nuclear fuel is normally burnt.

That is, it is seen from the analyzed results that the nuclear fuel pellet having significantly improved thermal conductivity through the preparing method according to the present invention when compared to that of the $UO_2$ pellet.

Figure 8:
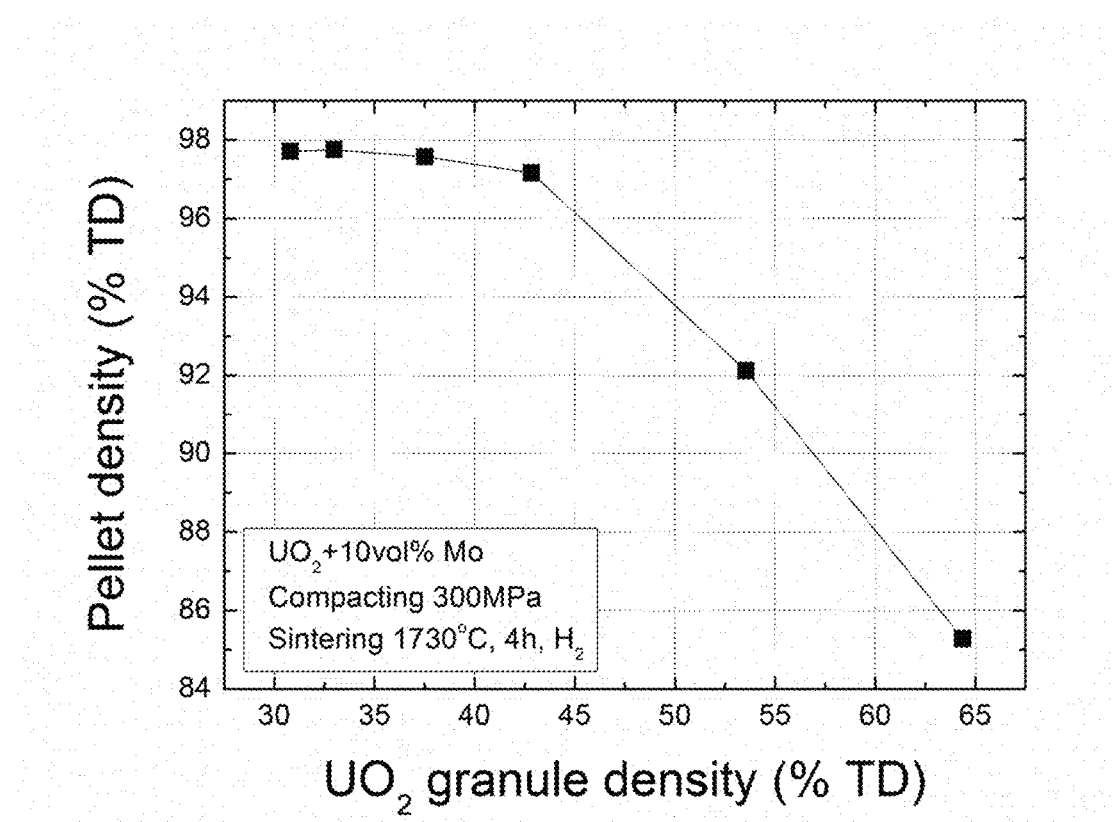
FIG. 8 is a graph obtained by analyzing a density of the nuclear fuel pellet depending on a variation in density of an oxide nuclear fuel granule.

<Experimental Example 3> Analysis of Density Variation Depending on Density of Granule To analyze a variation in density of the final nuclear fuel pellet prepared according to the density of the nuclear fuel granule that is used in the preparing method of the present invention, the pellets prepared according to Embodiments and Comparative Examples are measured through the Archimedes method, and the measured results are depicted in FIG. 8 as a graph.

As illustrated in FIG. 8, it is seen that all of the pellets prepared according to Embodiment 1 to 4 of the present invention have about 97% T.D. or more.

On the other hand, in case of the pellets prepared according to Comparative Examples 1 and 3, it is seen that the interface wholesomeness between the nuclear fuel and the metal is very poor, as wall as the pellets significantly decrease in density when the granules increase in density.

In the method of preparing the nuclear fuel pellet according to the present invention, since the thermal conductive metal, but rather the metal oxide, is directly used, the sintering may be performed under the reducing gas atmosphere that is the same as that of the commercial pellet preparing process. Thus, the compatibility with respect to the existing commercial preparing process may be very superior.

Also, since the liquefied oxide formation process and the reducing process are omitted, the distribution uniformity of the metal material within the pellet may be superior. Therefore, the nuclear fuel pellet in which the metal network and fine structure are uniformly distributed within the pellet may be prepared.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of preparing a nuclear fuel pellet comprising a thermal conductive metal network, the method comprising:

preparing an oxide nuclear fuel granule having about 30% to about 45% theoretical density (T.D.);

mixing the prepared oxide nuclear fuel granule with a thermal conductive metal powder compacting the oxide nuclear fuel granule with which the thermal conductive metal powder is mixed to prepare a green pellet; and sintering the green pellet prepared.

2. The method as set forth in claim 1, wherein the oxide nuclear fuel comprises at least one kind of metal oxide nuclear fuels selected from the consisting of $UO_2$, $PuO_2$, and $ThO_2$.

3. The method as set forth in claim 1, wherein the thermal conductive metal powder comprises at least one kind of metals selected from the group consisting of molybdenum (Mo), tungsten (W), and chromium (Cr).

4. The method as set forth in claim 1, wherein the thermal conductive metal powder is mixed at a ratio of about 5 volume % to 15 volume % with respect to the oxide nuclear fuel granule.

5. The method as set forth in claim 1, wherein the thermal conductive metal powder has a size of about 10 μm or less.

6. The method as set forth in claim 1, wherein the green pellet is prepared at a compaction pressure of about 100 MPa to about 500 MPa.

7. The method as set forth in claim 1, wherein the sintering is performed under a hydrogen gas atmosphere.

8. The method as set forth in claim 1, wherein the sintering is performed at a temperature of about 1,300° C. to 1,800° C. for about 1 hour to about 10 hours.

9. The method as set forth in claim 1, the nuclear fuel pellet comprises a thermal conductive metal having a network structure.

10. The method as set forth in claim 1, wherein the nuclear fuel pellet has a density that is greater than about 96% theoretical density (T.D).

11. The method as set forth in claim 9, wherein the thermal conductive metal having the network structure is distributed in at least one nuclear fuel pellet.

12. A method of improving thermal conductivity of a nuclear fuel pellet, the method comprising:

mixing an oxide nuclear fuel granule having about 30% to about 45% theoretical density (T.D.) with thermal conductive metal powder;

compacting the oxide nuclear fuel granule with which the thermal conductive metal powder is mixed to prepare a green pellet; and sintering the green pellet, wherein a network structure of a thermal conductive metal is formed in the pellet.

13. The method as set forth in claim 1, wherein the prepared oxide nuclear fuel granule has a size of about 200 μm to about 1,000 μm.

14. The method as set forth in claim 12, wherein the prepared oxide nuclear fuel granule has a size of about 200 μm to about 1,000 μm.

* * * * *